Feb. 25, 1947.   A. O. FRANZ ET AL   2,416,576
FLAT TYPE DRY BATTERY
Filed Oct. 20, 1943
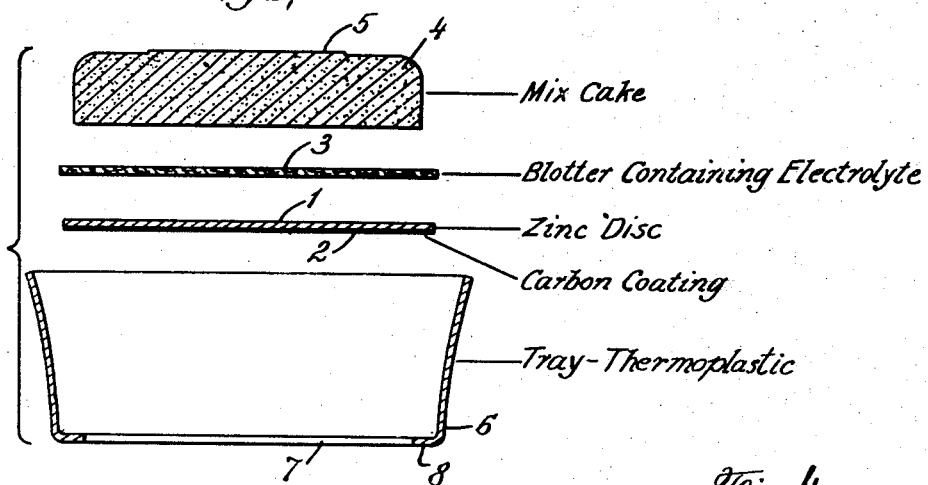
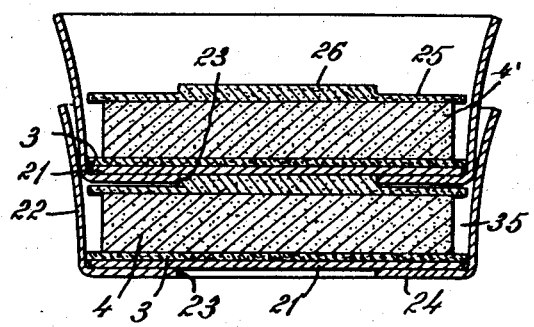
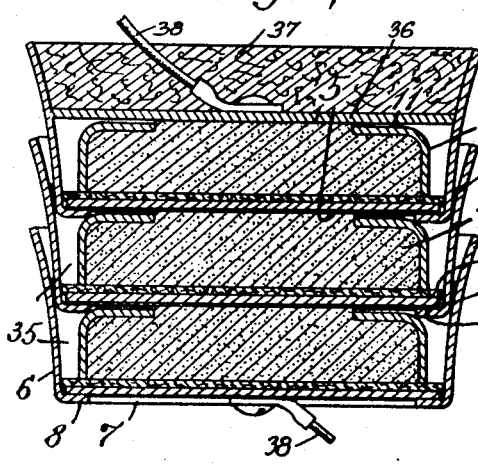
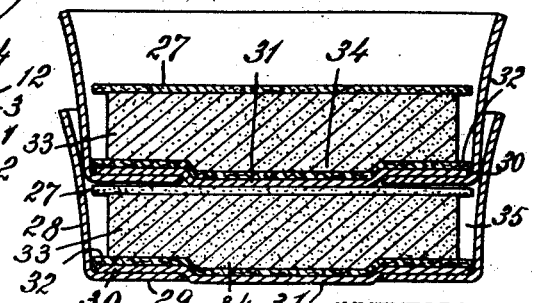
INVENTORS
Arvel O. Franz
John M. Martinez
Morris D. Koppelman
BY
Pennie, Davis, Marvin & Edmunds
ATTORNEYS Patented Feb. 25, 1947

2,416,576

UNITED STATES PATENT OFFICE 2,416,576

FLAT TYPE DRY BATTERY

Arvel O. Franz, East Alton, Ill., and John M. Martinez and Morris D. Koppelman, New Haven, Conn., assignors to Olin Industries, Inc., a corporation of Delaware Application October 20, 1943, Serial No. 506,960

7 Claims. (Cl. 136—111)

This invention relates to primary batteries and more particularly to batteries of the "flat type" consisting of a number of cells formed of flat elements.

In the earlier types of flat battery, the flat cell elements were arranged in proper order to produce a battery of the desired number of cells and then wrapped with tapes or the like, while under compression, to keep the elements in intimate contact with each other. Instead of wrapping the assembly with tapes, it was some times placed in a container and suitable wedges arranged in the space between the ends of the battery and the inside walls of the container to place them under compression. In either instance the battery after being placed in the container, and while under compression, was surrounded by a suitable plastic material which was poured into the container, while in liquid or semi-liquid form, to fill the voids, and, when solidified, to retain the electrolyte in place.

Another type of flat battery consists of separate groups of flat elements which may or may not form complete cells but in which the peripheral margin of certain groups of elements are covered with an integument to insulate the electrolyte in the respective cells, and the entire battery held in compression by binding tapes or the walls of the container in which it is confined. In constructions heretofore proposed the groups of elements are incapable of maintaining the desired pressure for purposes of electrical contact without additional means such as the aforesaid tapes or container wall.

The battery forming the subject matter of the present invention is an improvement over the flat type batteries heretofore constructed in that the means for securing the separate groups of elements to each other also serves to hold the assembly under compression, and eliminates the necessity of an outer container. It also provides a seal for holding the electrolyte in place, and isolating the electrolyte of each cell from adjacent cells.

In the present invention, the cell elements are assembled in groups and then placed in suitable trays. The side walls of each of the trays are of greater height than the combined thickness of the elements of a group and when a number of groups are assembled to form a battery, the upper portion of the side wall of the tray of a lower group overlaps a portion of the side wall of the upper group. By forming the tray of a di-electric material, which is also thermoplastic, the overlapped portions of the walls may be sealed to secure the groups to each other to form a complete battery. This sealing operation is preferably performed while the assembly is under pressure and when the sealing is completed it not only results in securing the groups together to form a complete, rigid battery, but it also eliminates the necessity of the use of tapes or other tying means to retain the desired pressure and thus maintain the cell elements in intimate contact with each other. The provision of a tray of the type herein disclosed for the purpose of retaining the elements of a group has other advantages which will be apparent from the following specification.

In the accompanying drawing we have shown several embodiments of the invention. In this showing:

Fig. 1 is a vertical, sectional view of the elements of a group showing the elements separated for clarity of presentation;

Fig. 2 is a similar view of a mix cake in which a separate ring is provided for the mix cake;

Fig. 3 is a vertical, sectional view of a battery formed of a plurality of cells;

Fig. 4 is a view of a battery showing a different arrangement from that shown in Fig. 1 and in which each group forms a complete cell; and Fig. 5 is a detailed view of a further modification.

Referring to Fig. 1 of the drawing, the reference numeral I designates a disc of zinc to form one of the electrodes of the cell. In the form of the invention illustrated in Fig. 1 in which the elements of a group do not form a complete cell, a coating 2 of carbon is placed on the lower side of the zinc electrode to form the carbon electrode of an adjacent cell. The provision of duplex electrodes of this type for use in flat cells is well known in the art and a further description of the method of forming this coating is therefore deemed to be unnecessary. On the opposite side of the zinc electrode we provide a layer 3 of blotting paper or other fibrous bibulous material adapted to form a separator. The separator is preferably provided with a coating of paste on the side adjacent the zinc electrode and carries the usual electrolyte. A mix cake 4 is arranged adjacent the separator and consists of a compressed cake of the usual depolarizing mix used in dry cells. It may thus consist of powdered carbon and manganese dioxide with a suitable binder to retain the components in cake form. The depolarizer may contain the usual electrolyte. The central portion of the top of the mix cake may be provided with a bulge or extension 5 as shown.

It will be apparent that the group of elements arranged as described does not form a complete cell, but when a plurality of these groups are arranged in intimate contact with each other, the carbon coating of the next adjacent group in contact with the top 5 of the mix cake forms a complete cell and, due to the intimate contact between the carbon and the zinc, forms a perfect series connection with the next adjacent cell. This group of elements is then assembled in a suitable tray 6. The tray is substantially rigid and is cup shaped, the bottom of which is provided with an opening 7 extending over substantially the entire area of the bottom to permit contact between the carbon electrode 2 of one group and the top 5 of the adjacent mix cake. The opening 7, however, terminates slightly inwardly of the side walls of the container to provide a flange 8 for supporting the elements of the group.

The tray may be formed of any di-electric material but is preferably formed of a material that is thermoplastic to permit sealing of a plurality of groups of cell elements to each other to form a battery consisting of a plurality of cells. Any of the various thermoplastic synthetic resins or other thermoplastic materials may be employed in manufacturing the tray. We may thus employ vinyl resins, various cellulose compounds and other materials possessing the desired di-electric properties and also possessing thermoplastic properties.

The group of elements heretofore described may be placed in the tray, or the mix cake may be first placed in a separate ring 10 as shown in Fig. 2 of the drawing. The ring 10 may be made of any suitable insulating material and is preferably made of the same material as the tray 6. The ring 10 is in the form of an inverted cup surrounding the side walls of the mix cake and having an open bottom. The top is provided with an opening for the projection of the top portion 5 of the mix cake thus forming a ledge or flange 11 which rests upon the depressed edge portion of the mix cake. The ring 10 is not essential to electrical operation but may be advantageously employed to support the compressed mix cake to prevent breakage of the compressed mix cake.

The group of elements placed in the tray 6, with or without the ring 10 for the mix cake, is then assembled with similar groups of elements until an assembly is obtained consisting of the necessary number of cells to form the desired battery. As shown in Fig. 3 of the drawing, the height of the side wall of the tray 6 is greater than the total thickness of the elements of the group providing an upper portion 12 of each tray side wall which overlaps the lower portion of the adjacent tray side wall. The overlapped portions of the side walls of the tray are secured to each other in any suitable manner. Thus a suitable adhesive may be arranged on the overlapped surfaces for the purpose of sealing them to each other. We prefer, however, to employ a thermoplastic material and form a thermoplastic seal between the overlapping portions. In the sealing operation the assembled units are maintained under slight pressure with the overlapped portions of the side walls of the trays in contact with each other. The side walls may then be heated in any suitable manner to soften the thermoplastic material and seal the units to each other. The proposed method of doing this is to subject the joint to be sealed to the passage of high frequency or oscillating electrostatic field.

In forming flat type batteries it is the usual practice to place the assembly under compression for the purpose of securing intimate contact between the cell elements. It will be noted that the top portion 5 of the mix cake is of sufficient thickness to extend through the opening 7 in the bottom of the next adjacent tray and intimately contact with the carbon coating 2 of the next adjacent group of cell elements. Heretofore when a plurality of groups of cell elements of the general type herein disclosed have been assembled to form a battery, the means for securing the groups to each other have not been capable of maintaining the assembly compressed when the pressure is removed. In assembling the plurality of groups of elements of our construction to form a battery, we carry out the sealing operation while the assembly is under compression and with the walls of the trays sealed to each other as heretofore described, we eliminate the necessity of the use of tapes or other means for retaining the assembly under compression. While in commercial use the battery so formed may be placed in an outer container and suitable connections made to the terminals of the battery and to binding posts on the exterior of the container, as is the usual practice, we do not rely upon the container to retain the cells in intimate contact with each other, and thus the container may be eliminated or used as desired. A metal plate 36 may be placed upon the mix cake of the upper cell and the portion of the tray above this metal plate may be filled with pitch or other suitable material as indicated at 37. Leads 38 may be connected to the electrode at the bottom of the lowest tray and to the plate 36.

While the construction heretofore described possesses advantages from the manufacturing standpoint in the use of the duplex electrode in which each individual group of elements does not form a complete cell, the tray 6 may also be employed with a group of elements forming a complete cell as shown in Fig. 4 of the drawing. As shown in Fig. 4, we employ a zinc electrode 21 which is not provided with a coating of carbon on one face. This electrode is arranged in a tray 22 of substantially the same construction heretofore described. The tray shown in Fig. 4, however, is provided with a smaller opening 23 than the opening 7 of the tray of Figs. 1 and 4 formed by making the flanges or ledges 24 of greater width. A separator 3 and mix cake 4' of the general type heretofore described are arranged above the electrode, the mix cake, however, having a flat upper surface as shown. A suitable carbon electrode 25 is arranged over the mix cake. This electrode may be formed in any suitable way and is preferably formed by coating and impregnating a relatively porous material with carbon or by forming a film of a suitable electrically conductive, non-metallic material. An additional thickness 26 may be provided in the central portion of the electrode to project through the opening 7 in the bottom of the tray of the next adjacent unit.

Fig. 5 shows a further modification of the construction shown in Fig. 4 in which the carbon electrode 27 is of substantially the same thickness throughout and in which the zinc electrode is shaped to project through the opening in the bottom of the tray. As shown, the tray 28 is provided with an opening in its bottom wall formed by flanges or ledges 29 and a zinc electrode 30 is arranged in the bottom of the tray having a depressed central portion 31 which projects through the central opening of the tray and contacts with the carbon electrode 27 of the next adjacent group. A separator 32 is arranged on the opposite face of the zinc electrode and when the elements are assembled the central portion of the separator follows the contour of the face of the zinc electrode. A mix cake 33 is arranged over the separator, and the mix cake has a portion 34 formed on its bottom face which projects into the depressed central portion of the separator.

In the various forms of the invention, as illustrated, the electrodes and the separator are of a diameter substantially equal to the diameter of the bottom of the tray whereas the mix cake is of slightly smaller diameter providing a space 35 surrounding the mix cake to serve as an expansion chamber for the electrolyte expansion and accumulation of gases.

We claim:

1. A primary battery comprising a plurality of substantially flat cell elements arranged in proper order to form a plurality of cells, said elements being arranged in groups, and a substantially rigid tray for each of said groups, the tops and bottoms of the trays having openings therein to permit contact between the elements of adjacent groups, the walls of each tray extending beyond the group of elements and overlapping the walls of the tray of the adjacent group when the groups are assembled to form a battery, the overlapped portions of the walls of the trays being permanently sealed to each other by the application of pressure while the walls are in a softened state.

2. A primary battery comprising groups of substantially flat cell elements, each group consisting of an anode, a carbon electrode, a mix cake, and a separator between the anode and the mix cake, and a substantially rigid tray for each of said groups, the tops and bottoms of the trays having openings therein to permit contact between the elements of adjacent groups, the trays being formed of a thermoplastic, di-electric material, the side walls of the trays extending beyond the group of elements and overlapping the side walls of the trays of the adjacent groups when the groups are assembled, the overlapped portions of the walls being permanently sealed to each other by the application of pressure while the walls are in a softened state.

3. A primary battery comprising groups of substantially flat cell elements, each group including a duplex electrode consisting of an anode having a coating of carbon on one side forming a carbon electrode, a mix cake, and a separator arranged between the mix cake and the uncoated side of the anode, and a substantially rigid tray for each of said group of elements, the trays being formed of a thermoplastic, di-electric material having openings in the top and bottom thereof to permit contact between the elements of adjacent groups, the walls of the trays extending above the elements when the elements are arranged therein and overlapping the walls of the tray of the adjacent group when the groups are assembled to form a battery, the overlapped portions of the walls being heat sealed to each other.

4. A primary battery comprising a plurality of substantially flat cell elements arranged in proper order to form a plurality of cells, said cell elements being arranged in groups, and a substantially rigid tray for each of said groups, the trays being formed of thermoplastic, di-electric material having openings in the tops and bottoms thereof to permit contact between elements of adjacent groups, the side walls of each tray being heat sealed to the next adjacent tray.

5. A primary battery comprising groups of substantially flat cell elements, each group consisting of an anode, a carbon electrode, a mix cake, and a separator between the anode and the mix cake, and a substantially rigid tray for each of said groups, the trays being formed of a thermoplastic di-electric material having openings in the tops and bottoms thereof to permit contact between the elements of adjacent groups, the carbon electrodes being shaped to project through the openings in the trays to contact with the adjacent zinc electrode, the side walls of each tray being heat sealed to the next adjacent tray.

6. A primary battery comprising groups of substantially flat cell elements, each group consisting of an anode, a carbon electrode, a mix cake, and a separator between the anode and the mix cake, and a substantially rigid tray for each of said groups, the trays being formed of a thermoplastic di-electric material having openings in the tops and bottoms thereof to permit contact between the elements of adjacent groups, the zinc electrodes being shaped to project through the openings in the trays to contact with the end element of the adjacent group, the side walls of each tray being heat sealed to the next adjacent tray.

7. A primary battery comprising a plurality of substantially flat cell elements arranged in proper order to form a plurality of cells, said cell elements being arranged in groups, and a substantially rigid tray for each of said groups, the trays being formed of thermoplastic, di-electric material having openings in the tops and bottoms thereof to permit contact between elements of adjacent groups, the side walls of the trays being permanently sealed to each other by the application of pressure while the walls are in a softened state.

ARVEL O. FRANZ.
JOHN M. MARTINEZ.
MORRIS D. KOPPELMAN.

REFERENCES CITED

The following references are of record in the file of this patent:

UNITED STATES PATENTS

| Number | Name | Date |
| --- | --- | --- |
| 1,464,413 | Doe | Aug. 7, 1923 |
| 1,097,910 | Broad | May 26, 1914 |
| 2,272,969 | French | Feb. 10, 1942 |
| 2,307,761 | Deibel | Jan. 12, 1943 |
| 770,277 | Fiedler | Sept. 20, 1904 |
| 2,375,875 | Sanderson | May 15, 1945 |

FOREIGN PATENTS

| Number | Country | Date |
| --- | --- | --- |
| 549,036 | British | Nov. 3, 1942 |
| 226,806 | British | Dec. 7, 1924 |
| 554,926 | British | July 26, 1943 |